United States Patent

[11] 3,547,358

[72] Inventors Robert R. Anderson;
 Joseph A. Anderson; Chester Neukom, Minot, N. Dak.
[21] Appl. No. 729,693
[22] Filed May 16, 1968
[45] Patented Dec. 15, 1970
[73] Assignee J & J Manufacturing, Incorporated
 Minot, N. Dak.
 a corporation of North Dakota

[54] HAY AND GRAIN COMBINATION MILL
 16 Claims, 5 Drawing Figs.
[52] U.S. Cl. ..................................................... 241/44,
 241/49, 241/73, 241/189
[51] Int. Cl. ....................................................... B02c 13/04,
 B02c 13/13, B02c 13/288
[50] Field of Search ........................................... 241/73,
 101.8, 138, 186, 189, 191, 193, 223, (Digest #25),
 44, 49, 51, 55, 86, 89, 285, 59; 146/70.1

[56] References Cited
 UNITED STATES PATENTS
 2,862,668 12/1958 Stohsner ..................... 241/138
 2,246,902 6/1941 Smith ......................... 241/189X
 1,828,490 10/1931 Clement ..................... 241/189
 FOREIGN PATENTS
 633,066 9/1935 Germany ..................... 241/138

Primary Examiner—Robert C. Riordon
Assistant Examiner—Donald G. Kelly
Attorney—Dugger, Peterson, Johnson & Westman ABSTRACT: A mill for simultaneously grinding hay and grain and having means for providing thorough mixing after grinding. The unit is made with two compartments, one for grinding the hay and one for grinding grain. The cylinder used is uniformly made so that the hammers are evenly spaced along its length. The feeding mechanism for the hay includes baffles to increase the performance of the mill in unfavorable conditions. The mill is portable, and is driven from the power takeoff shaft of the tractor or the like.

PATENTED DEC 15 1970

INVENTORS
ROBERT R. ANDERSON
JOSEPH A. ANDERSON
CHESTER NEUKOM
BY Dugger, Peterson, Johnson & Westman
ATTORNEYS

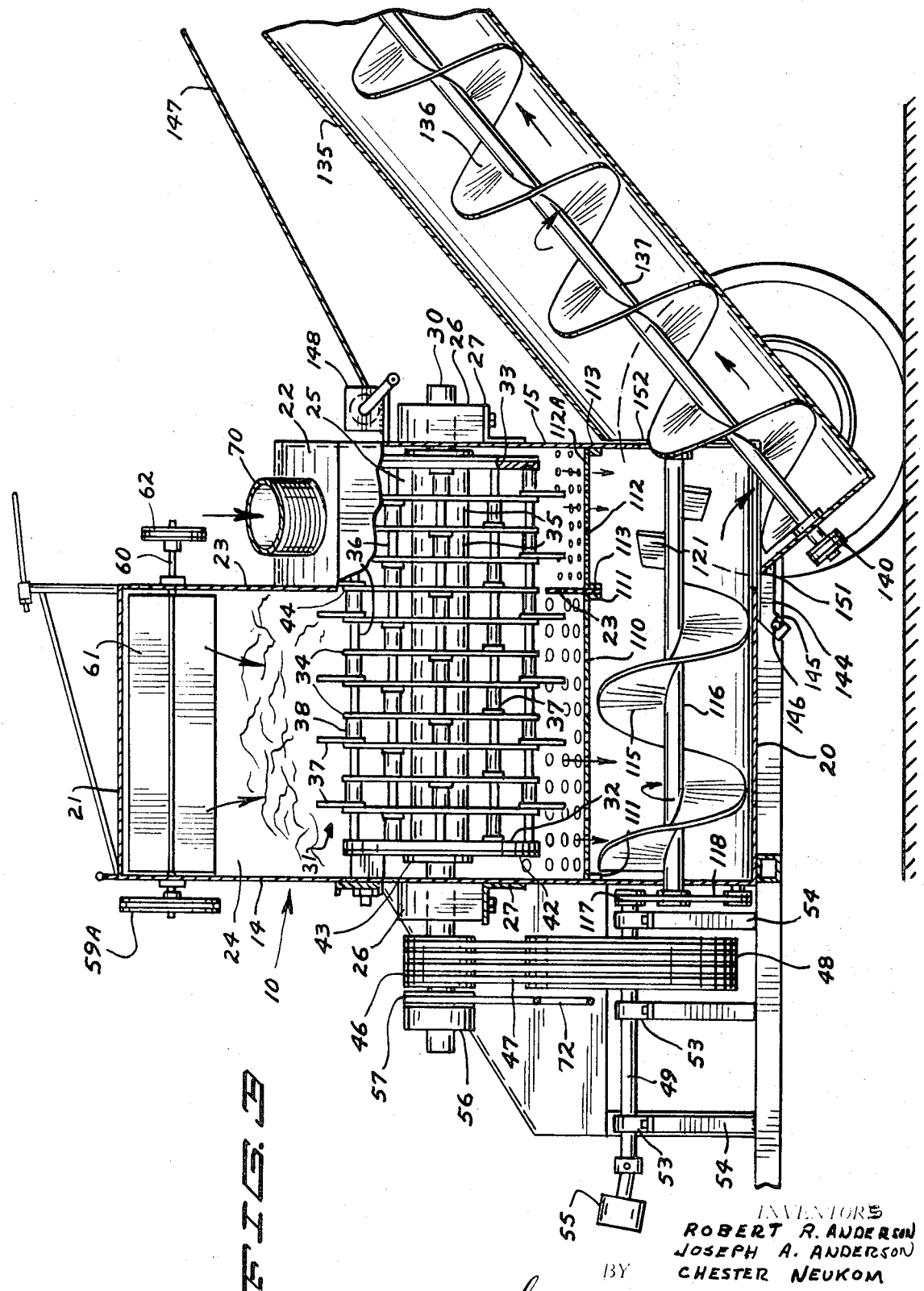

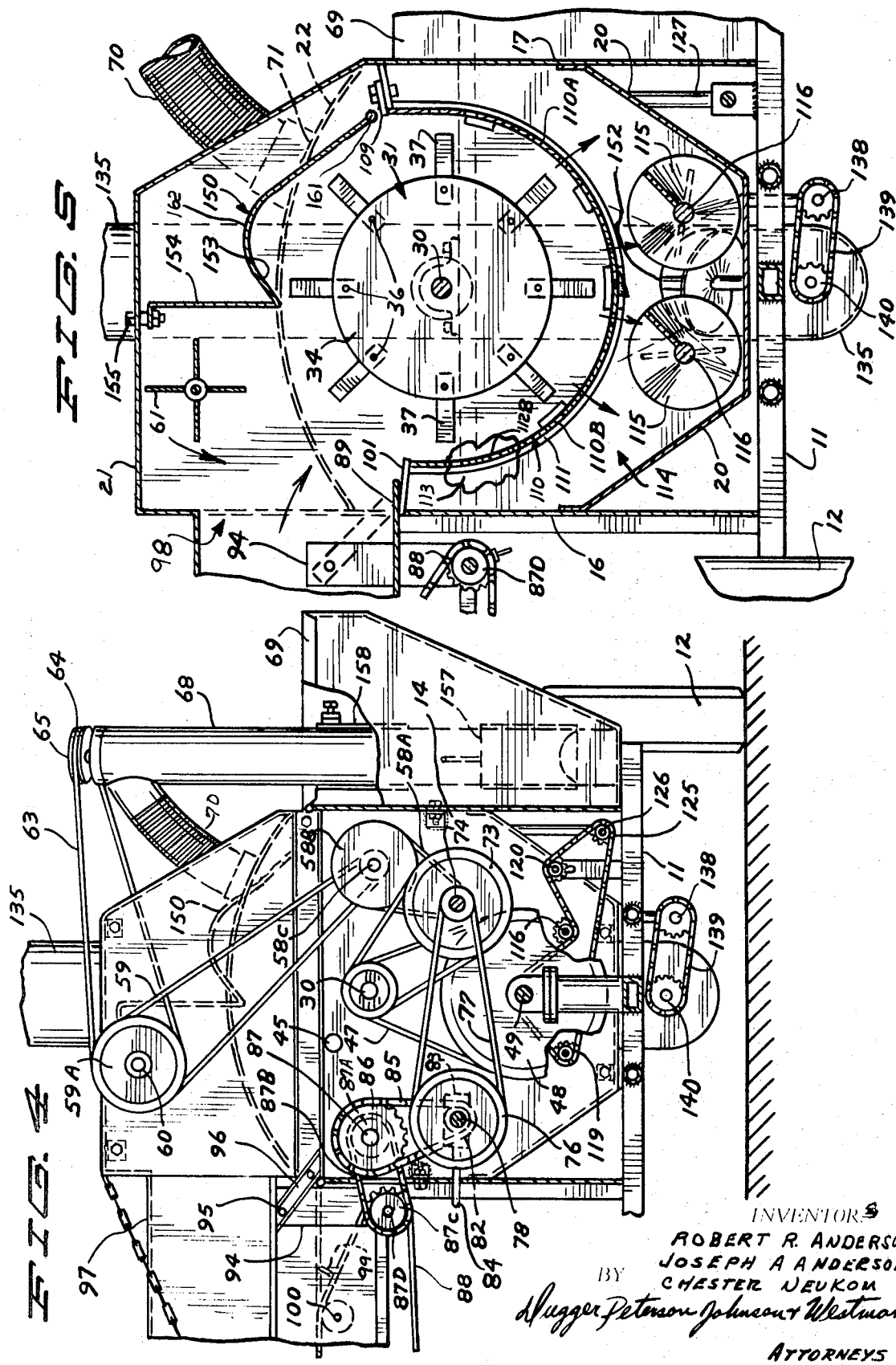

HAY AND GRAIN COMBINATION MILL

BACKGROUND OF THE INVENTION

1. Field of the Invention

This invention relates to combination hay and grain mills.

2. Prior Art

The closest prior art known to the applicant is the patent of Stohsner, U.S. Pat. No. 2,862,668. A combination hay and grain mill is shown in Stohsner, but it does not involve the unique cylinder figuration and partitioning of the present invention, nor does it include the use of twin augers below the combination mill to completely mix the material right in the mill and a delivery auger for removing it from the mill. Further, the present invention includes a grain storage tank right on the unit and improved means for feeding the hay into the hay grinding section of the mill.

SUMMARY OF THE INVENTION

The present invention relates to improvements in combination hay and grain mills including a new cylinder construction, easily installed screens, and means for mixing the ground hay and grain immediately after grinding within the portable mill.

Additionally, the mill includes a unique feed arrangement and internal baffling for improved hay grinding characteristics in the field.

BRIEF DESCRIPTION OF THE DRAWINGS

FIG. 3 is a sectional view taken as on line 3–3 in FIG. 1;

FIG. 4 is a sectional view taken as on line 4–4 in FIG. 2; and

FIG. 5 is a sectional view taken as on line 5–5 in FIG. 2.

DESCRIPTION OF THE PREFERRED EMBODIMENT

Figure 1:
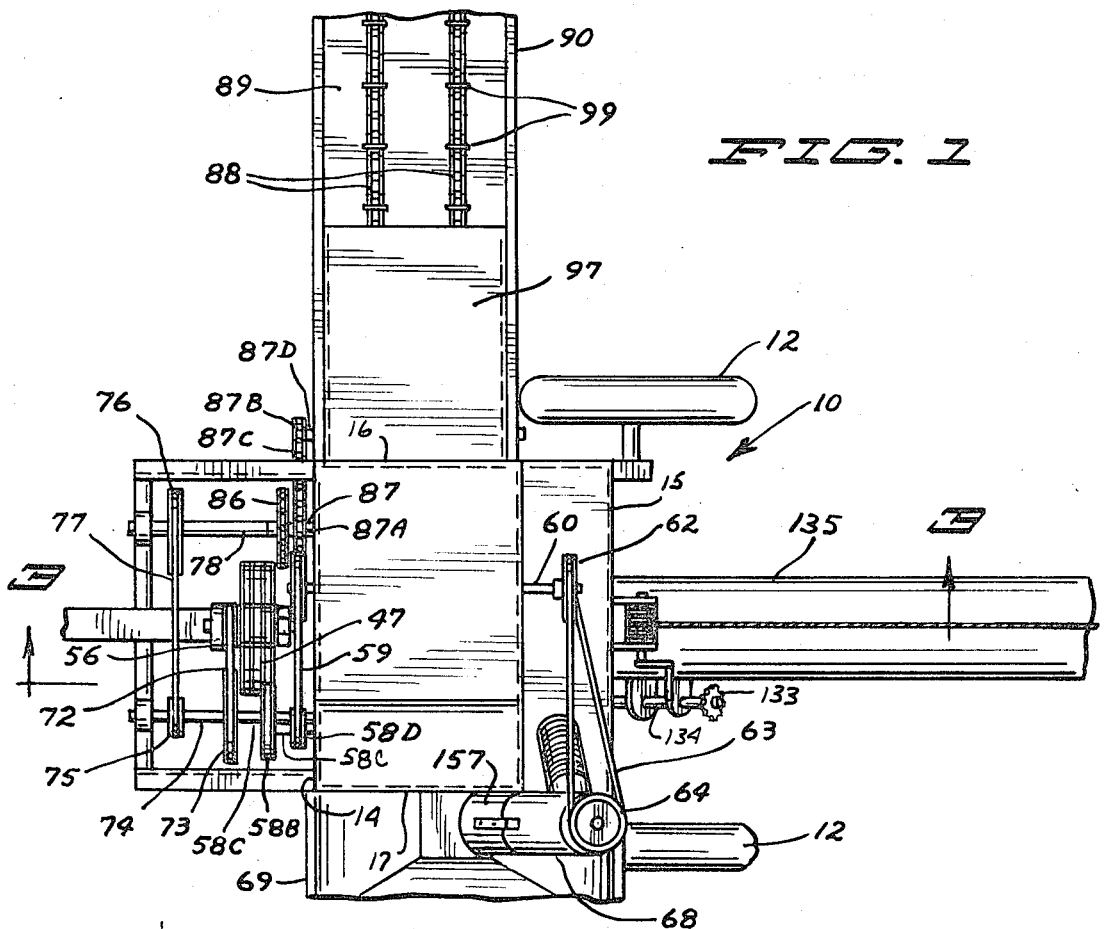
FIG. 1 is a top plan view of a portable hay mill made according to the present invention with parts broken away.
Figure 2:
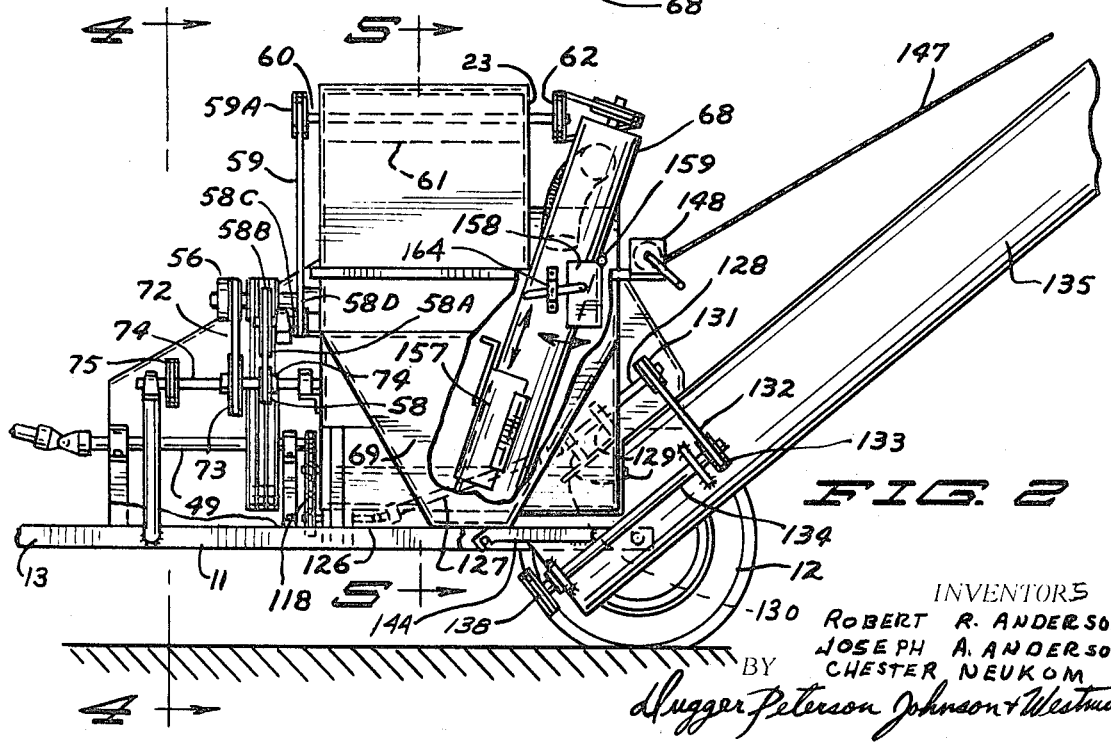
FIG. 2 is a side elevational view of the device in FIG. 1.

A combination hay and grain mill illustrated generally at 10 includes a main mounting frame 11 supported by a pair of rotatably mounted wheels 12,12 and including a forward extending tongue 13 which can be attached to a tractor or towing vehicle. Frame 11 is made up of square tubular members which in turn support upright housing members or walls 14 and 15 which form the ends of the machine in the fore and aft direction and housing members or walls 16 and 17 which form the sides of the machine. A bottom member or wall 20 has tapered sides and a horizontal bottom wall section forming an interior chamber. A top wall 21 closes off the main part of the unit, where the hay is ground and a top wall 22 closes off the section where grain is to be ground. The wall 14 is bolted in place and can be removed from the other walls of the structure. A divider wall 23 extends between the sidewalls 16 and 17 to divide the interior compartment into a hay grinding compartment 24 and grain grinding compartment 25. As shown, the grain grinding compartment is smaller than the hay grinding compartment because of the relative capacities necessary to do the grinding. The divider wall 23 terminates above the bottom wall 20.

A pair of pillow block bearings 26 are mounted onto suitable brackets 27 on the walls 14 and 15, and the bearings in turn support a shaft 30 for rotation about an axis extending between the walls. The shaft 30 is used for mounting a cylinder assembly illustrated generally at 31. The cylinder assembly is mounted onto the shaft 30. The cylinder assembly comprises a pair of heavy end plates 32 and 33, respectively, which are threadedly mounted onto the shaft 30 (with threads so both plates tend to tighten during use). The end plate 33 has an annular groove on its inwardly facing surface adjacent the outer edge thereof, and the end plate 32 has 8 holes therethrough equally spaced around the periphery. In addition, there are a plurality (11 as shown) of radial cylinder plates 34 positioned between the end plates. The cylinder plates 34 each have eight holes spaced around the periphery thereof, and the plates are keyed onto the shaft 30 and equally spaced apart with pipe spacers 35 so that the plates 34 are properly spaced on the shaft. The end plate 33 can be locked in place with suitable fastener means. A plurality of rods 36 are then inserted through the aligning openings of the plate 32 and plates 34, and the ends of the rods fit within the provided groove of plate 33. As the rods are installed, a plurality of hammers 37 are placed onto the rods. The hammers are apertured to receive the rods, and a pipe spacer 38 is positioned by each of the hammers to keep the hammers from tracking or aligning exactly from one rod to the other. The hammers are put on in every other space between the plates 34 along the individual rods as shown, and are staggered to give proper action.

After the rods 36 are all installed, a lock plate 42 is placed over the shaft 30 adjacent plate 32 and held in place with a locking ring 43, and cap screws threaded into the ring. The lock plate covers the holes in plate 32 to retain the rods in place and keep them from sliding axially out of the cylinder assembly. The lock plate 42 does have holes to permit removal of the rods 36, but the plate is rotated so the rods cannot slip out during use. The center divider wall 23 has a large aperture or opening 44 therethrough so that a plate 34 on the cylinder will rotate within the aperture. One of the plates 34 substantially aligns with the wall 23.

The forward wall 14 is provided with an aperture 45 aligning with one of the rods 36 at a time. When the hammers are to be replaced or serviced, the lock plate 42 can be rotated until the apertures (it has eight as well) in the plate 42 align with the apertures through the plate 32 and then the rods can in turn be slid out through these apertures and through aperture 45. As each of the rods 36 are slid out, the hammers can be removed and then as the rod is slid back into place new hammers are placed onto the rods. Also, after removing the hammers, by removing front wall 14, and of course, the drives on shaft 30, the shaft 30 and its attached cylinder plates can be removed as an assembly because of the large opening in divider wall 23. There is no need to completely disassemble the cylinder inside the machine if parts are to be changed.

The forwardly extending end of shaft 30 mounts a triple V pulley 46 and the pulley 46 in turn is driven with a plurality of V belts 47 from a pulley 48 which is drivably mounted onto a shaft 49. The shaft 49 in turn is mounted in bearings 53 which are mounted on vertical supports 54 attached to the frame 11. The shaft 49 is driven from the power takeoff illustrated schematically at 55 of a tractor to supply power to the machine.

A centrifugal clutch assembly 56 is drivably mounted onto the shaft 30, and is made so that when the speed of the shaft 30 exceeds a predetermined amount the clutch will engage driving a pulley 57. The pulley 57 drives a belt 72 which in turn drives a pulley 73 that is drivably mounted onto a shaft 74. The shaft 74 is a first jack shaft rotatably mounted on suitable supports. A pulley 58 is drivably mounted onto one end of shaft 74 and this drives a belt 58A which drives a pulley 58B which in turn is mounted on a second jack shaft 58C that is rotatably mounted in suitable bearings on the machine. Second pulley 58D is mounted on the opposite end of shaft 58C and drives a belt 59. Belt 59 drives a pulley 59A that is drivably mounted onto a shaft 60 that mounts a hay beater 61 inside the housing. The shaft 60 extends through the housing and is rotatably mounted in the side plates of the housing. A pulley 62 is drivably mounted onto the opposite end of the shaft 60 from pulley 59A. The pulley 62 drives a V belt 63 which in turn drives a pulley 64 drivably mounted on the outer end of an auger shaft 65. The belt is twisted to drive the pulley 64 and suitable guide sheaves can be used to get the drive to work properly. The auger shaft drives a helical screw positioned inside a tube 68 thereby forming an auger conveyor. The tube 68 is mounted so that the inlet end thereof is adjacent the bottom of a grain storage hopper 69 that is attached to the side of the machine. The storage hopper 69 can be used for storing grain that is to be ground, and upon driving the auger shaft 67, grain from the hopper will be conveyed by the auger into a flexible tube 70 and then into a provided opening 71 in the top wall 22 of the grain section of the mill. Grain will then drop down into the mill, and be ground by the cylinder assembly 31.

The shaft 74 drives a second pulley 75 which drives a belt 77 that drives a pulley 76. The pulleys 75 and 76 can be variable in size to form a speed adjustment means in a known manner. The pulley 76 drives a jack shaft 78 which is rotatably mounted with respect to the frame on suitable bearings. The shaft 78 also has a sprocket 82 drivably mounted thereon adjacent the frame. The sprocket 82 is drivably mounted to the shaft through a clutch assembly 83 of a usual or preferred design having a clutch control handle 84 so that the drive to the sprocket 82 can be disengaged if desired. A chain 85 is drivably mounted over the sprocket 82 and in turn drives another sprocket 86. The sprocket 86 is drivably mounted onto a jack shaft 87. The jack shaft 87 drives a sprocket 87A which drives a chain 87B which in turn drives a sprocket 87C. The sprocket 87C drives a shaft 87D used for driving an apron conveyor chain assembly 88. The conveyor chain assembly is mounted on suitable sprockets on shaft 87D and is mounted for movement along a conveyor bed 89 of a bale feed conveyor or apron 90. The conveyor for the bales is comprised of a frame 93 that supports the bed 89 and including a pair of inner frame members 94 that are pivotally mounted as at 95 to brackets 96 attached to the frame of the mill. The conveyor has a hood 97 over the top thereof adjacent to the mill input, and the hood can be removed so that upon disconnecting the chain 87B the conveyor can be raised up about the pivot 95 into a transport position.

During normal use, the conveyor will be positioned as shown and will align with and feed material into a bale infeed opening 98 in the hopper assembly. The bale infeed conveyor can normally be supported with support cables or chains extending from the machine outwardly to an outer portion of the conveyor.

The conveyor or apron chain 88 has upright extending lugs 99 thereon for engaging hay bales illustrated in dotted lines in FIG. 1 and moving them under the hood 97 and into the mill. It should be noted that the bales are fed into the machine adjacent the top portions of the cylinder well above the center of the cylinder.

In the interior chambers, the bottom of the chambers are defined by screens. In the hay grinding chamber 24, a grinding screen 110 having large holes for grinding hay is positioned between the wall 14 and the divider 23. Suitable tracks 111 are provided on the walls 14 and 23 for supporting the screen. The screen is made in two part cylindrical pieces. The screen 110 comprises sections 110A and 110B. The screens mate in the center of the mill and have clips that keep the screens aligned. The screens are inserted by starting the screens at the rear of the cylinder and rotating them along the tracks 111 until one end of the first section abuts a shear bar 101. The second section is also rotated in place until it contacts the inner end of the first section. Then the second section is retained in place with stop bar 109 to lock the screens together. As can be seen, the screens clear the hammers with some space so that the material coming into the cylinder will be hit by the hammers and will be ground until it passes through the apertures of the screen 110.

Likewise, a completely separate screen assembly 112 is positioned in the lower portions of the hay chamber 25 and is supported by suitable guide means 113 positioned along the wall 15 and the divider wall 23. This screen also is in two sections 112A and 112B and is rotated in place and retained in place against a stop bar on one end, and a bolted bar similar to the bar 109 at the other end. Grain entering through opening 71 will be hit by the hammers of the cylinder 31 as it is rotating, and will be ground until it passes through the smaller apertures of the screen 112. The apertures in the screen 112 are smaller than those in the screen 110 for the hay.

The material that passes through the screens will drop down into a hopper section 114 defined by the wall 20. The hopper section is undivided and forms a common hopper for both the ground hay and the ground grain. A pair of helical augers 115 are mounted in the hopper section 114. The augers have central shafts 116 that are rotatably mounted in bearings on the wall 14 and also are mounted in suitable bearings on the wall 15. The augers thus extend from the front to the rear of the machine and are substantially parallel to the shaft 30, but are positioned below the screens 110 and 112. The auger helical sections terminate along a plane substantially aligned with the divider wall 23. Each auger has a pair of beater plates 121 welded thereto. The beater plates extend outwardly like vanes, but are slightly skewed with respect to the axis of the augers. The shafts 116 are powered directly from the shaft 49 through a sprocket 117 drivably mounted on the inner end of shaft 49 and driving a chain 118. Sprockets 119 are drivably mounted onto the shafts 116. A suitable tightener or idler 120 can be utilized for the chain drive.

The chain 118 also drives a sprocket 125 drivably mounted onto a shaft 126 that is rotatably mounted on the frame and extends from the front toward the rear of the machine.

The shaft 126 in turn drives a countershaft 127 through a universal joint and shaft 127 drives a shaft 128 through a second universal joint. Shaft 128 is rotatably mounted in bearings 129 mounted onto a support 130 on the frame. The shaft 128 extends beyond the rear wall 15 and in turn drives a sprocket 131. Sprocket 131 drives a chain 132 which in turn drives a sprocket 133 on a countershaft 134. The countershaft 134 is rotatably mounted in bearings supported on an auger tube 135. The auger tube 135 houses a discharge auger 136 having a center shaft 137. The shaft 137 has a sprocket 140 drivably mounted on an outer end thereof and the sprocket 140 is driven by a chain 139 that is driven from a sprocket 138 drivably mounted onto the outer end of the shaft 134. In this manner, a drive is obtained for the auger 136 even though it is inclined upwardly at an angle.

The auger tube 135 has a pair of hanger brackets 144 fixedly attached thereto and provided with slots 145 which will fit over an auger support member 146 which is fixed to the frame. The outer end of the auger is supported through a cable 147 that is driven from a winch 148 attached to the machine.

It should be noted that the wall 20 forming the bottom portion of the hopper 114 is cut away to provide an opening 151 adjacent the rear of the machine. One edge of the opening is aligned with the end of the auger flights on augers 115 and the opening extends toward wall 15. The wall 15 is also cut away to provide this opening. The tube 135 is cut away to provide an opening 152 mating with the opening 151 so that the material conveyed by the augers 115 in the hopper 114 will move through the opening 151 into the tube 135 and will be conveyed by the auger 136 upwardly and outwardly away from the hopper. The tube 135 is substantially larger in diameter than the auger 136 to promote mixing and to make it possible to convey ground hay.

The two augers 115 are rotating in directions so that the material is conveyed toward the openings 151. The beaters 121 engage the ground grain and hay and mix them together as the material drops through the opening 151. By controlling the speed of the feed of grain into the unit in relation to the feed of the hay, the mixing can be very accurate so that the desired ration can be obtained automatically right in the single mill. The auger 136 will continue to mix the material within the tube 135 as it is conveyed outwardly. The auger 136 can convey the material directly to a storage bin if desired, or can move it to any desired location. The auger tube 135 can be further supported with rods attached to the mill frame, if desired. The cable is used for raising and lowering the auger. The auger 135 can be removed for transport if desired.

Likewise, for transport, the apron for conveying bales can be pivoted up out of the way so that road clearance can be maintained.

The conveyor chain assembly is mounted on sprockets provided at the outer end of the conveyor. The feed chains ride on top of the conveyor bed for a substantial portion of the conveyor length. Adjacent the mill, however, the chains are guided by a pair of sprockets 100 so that the chains pass downwardly through a provided opening in the conveyor bed to the sprockets on shaft 87D. In so doing, the prongs or lugs 99 on the chains are pulled out of the bales being conveyed. The following portions of the bales force the leading portions along the conveyor bed and into the grinding cylinder. The conveyor bed extends to and rests upon a shear bar 101 adjacent the cylinder. The shear bar operates as a support or stop for the screens used with the mill, as well as supporting the conveyor bed. As the bales are fed in, there is no problem with the fingers or lugs pulling hay around with them as they pull out of the bale. The angled section of the chain removes the fingers very gently and practically straight out. The bale and chain move toward the mill together at the same time the fingers are coming out of the bale. Without such angled section, the conveyor chain changes direction abruptly and the fingers tend to carry the hay with them.

Referring to FIG. 4, it is shown that the entrance to the hay grinding chamber is provided with an adjustable baffle 150. The baffle 150 is pivotally mounted about an axis 161 to the sidewall 14 and 23, and as shown, the pivotal axis is adjacent the periphery of the cylinder near one end of the screens. The baffle 150 has an arcuate portion 162 which is of a much smaller radius than the cylinder, and which bulges up from the cylinder slightly, and then has a section 153 which is directed downwardly toward the cylinder. The baffle includes a vertical section 154 integral with the downwardly turned section 153. The vertical section 154 has a flange used with adjustment bolts 155 (two or more can be used) so that the position of the downwardly turned portion 153 with respect to the outer tips of the hammers can be changed.

The vertical portion 154 is immediately to the rear of the beater 61. As shown, bales of hay entering through the opening from the conveyor will be engaged by the beater and will be separated and batted downwardly toward the cylinder. The breaker or shear bar 101 provides a point about which the pieces of the bale will be separated as they are hit by the beater. The baffle 150 provides for a direction of the normal airflow which is present in a rotating member such as the cylinder. The air is directed downwardly in toward the center by the downwardly turned portion 153 so that the airflow generated by the rotating cylinder will not tend to blow the hay back out through the opening 98. By providing this control for the air to direct it back in toward the center, a much more efficient job of grinding can be obtained.

In the grain tank, the control of the feed of the grain is made with a small slide member 157 that is slidably mounted with suitable clips onto the auger tube 68 so that the opening at the bottom of the auger tube can be changed. Also, the auger tube 68 can be provided with a hole in the sidewall thereof and a door 158 pivotally mounted as at 159 can be provided over this hole. The adjustment of the door about the pivot 159 can be made with a handle attached to the door and held with a bracket and set screw to ensure that a certain amount of the grain conveyed by the auger will spill out through the opening. The door can be completely closed to shut off this spillage. In this manner, the excess grain is returned directly to the tank and the amount of grain discharged into the grinder can be accurately controlled.

Centrifugal clutch assembly is used to drive all of the components that feed material into the mill, including the grain auger and the bale conveyor. If the cylinder speed drops below a certain amount, the centrifugal clutch will disengage, and will stop the feed of material into the unit until the cylinder again picks up speed. Then the clutch will reengage and the drive for feeding both the grain and hay will restart.

We claim:

1. A mill having an interior chamber, a cylinder rotatably mounted in said chamber, said cylinder comprising a central shaft having a plurality of radially extending plates spaced along the length thereof, and drivably mounted thereon, a divider wall in said chamber having an opening therethrough of size to permit passage of said radial plates therethrough, a plurality of hammers pivotally attached with respect to said radial plates along the length of said cylinder, said cylinder being positioned with one of said radial plates substantially coplanar with said divider wall, and screen means beneath said cylinder forming a porous barrier within said chamber.

2. The combination as specified in claim 1 wherein said chamber has a bottom section below said screen means, a pair of auger means rotatably mounted side by side in said bottom section, and having axes extending substantially parallel to the axis of said cylinder, and means to rotate said auger means in counterrotational direction to convey material coming from said chamber, said chamber having a discharge opening through which the augers discharge material conveyed thereby.

3. The combination as specified in claim 1 wherein said divider wall divides said chamber into two compartments, and means for feeding hay into a first of said compartments comprising a conveyor bed, an endless conveyor member, means to mount said endless conveyor member for movement along said bed, a portion of a said endless conveyor member adjacent said first compartment moving at an angular relationship with respect to said bed, whereby said endless conveyor member departs gradually from the plane of said bed.

4. The combination as specified in claim 3 wherein a first of said compartments has the large opening above the cylinder for receiving hay, a deflector shield positioned within said opening and extending in direction along said cylinder, said deflector shield forming an arcuate portion over and spaced from the cylinder commencing from a point closely adjacent the cylinder in portions of the compartment remote from an inlet feed opening for hay, and extending upwardly and thence curving back downwardly toward the cylinder adjacent the top portion of the cylinder, and extending in direction of rotation of the cylinder thereby to deflect air generated by said cylinder back toward the axis of said cylinder adjacent the top portions thereof.

5. The combination as specified in claim 4 and a beater member rotatably mounted in the upper portions of said hay compartment and being positioned to engage top portions of a hay bale carried into the hay chamber by said conveyor to split said bale into sections as it moves toward said cylinder.

6. The combination as specified in claim 1 wherein the screen means in said chamber is divided into two sections, guide means for holding said screen means in position, said sections abutting each other substantially vertically below the axis of said cylinder.

7. The combination as specified in claim 2 wherein said divider wall divides said chamber into two separate compartments, and wherein said auger means have separate center shafts and helical flights which terminate along a plane generally below the divider wall in said chamber, and a pair of bladelike beater means extending outwardly from the center shafts of said auger means and being positioned below a second of said compartments.

8. The combination as specified in claim 3 wherein said second compartment has screen means with smaller diameter openings than said first compartment, and means to discharge grain into said second compartment.

9. The combination as specified in claim 8 and a separate grain tank mounted on said grinding mill, grain auger means to move material from said grain tank into said second compartment at the same time hay is being fed to said hay compartment, said grain auger means and said conveyor means for said hay having a common drive member, and centrifugal clutch means mounted on said cylinder shaft and operative to drive said common drive member when said cylindrical shaft exceeds a predetermined speed.

10. The combination as specified in claim 9 and means to regulate the amount of grain fed into the second compartment by said grain auger means.

11. The combination as specified in claim 3 wherein said endless conveyor member has fingerlike projections protruding upwardly therefrom and adapted to engage bales of hay on the conveyor member, said fingerlike projections being carried with said endless conveyor member along an inclined path tapering away from the conveyor bed adjacent the mill so that said fingers are removed from an engaged bale as the fingers move in direction of movement of said bale prior to the time the bale enters said hay compartment.

12. The combination as specified in claim 2 and a discharge auger conveyor positioned to receive material coming from the opening in said compartment into which said parallel auger means discharge, said discharge auger conveyor comprising an outer tube and a rotatable helical member therein which is substantially smaller than the outer tube.

13. The combination as specified in claim 1 wherein said hammers are mounted with respect to said radial plates by a plurality of hammer shafts spaced from the axis of said cylinder and extending in axial direction along said cylinder and passing through openings in said plates, said hammers being pivotally mounted on said hammer shafts between said plates.

14. The combination as specified in claim 13 and lock means on an end plate of said cylinder to hold said hammer shafts in place, said lock means being movable to permit said hammer shafts to be slid axially outwardly, said mill having a panel adjacent said lock means, and an opening defined in said panel and being positioned to align with each of said hammer shafts sequentially, to permit removal of said hammer shafts through said opening in said panel without removing the cylinder from said mill.

15. The combination as specified in claim 14 wherein said panel is removable, whereby said cylinder can be removed from both of said compartments through the opening in said divider wall.

16. A mill having an interior chamber defined by wall means, a cylinder rotatably mounted in said chamber, screen means adjacent said cylinder forming a porous barrier within said chamber, said cylinder comprising a central shaft having a plurality of radially extending support members spaced along the length thereof and drivably mounted thereon, a plurality of support shafts spaced from the axis of said cylinder and extending in axial direction along said cylinder and axially slidably mounted on said support members, a plurality of hammer means pivotally mounted on each of said support shafts between said radial support members, adjustable lock plate means positioned on one of said radial support members of said cylinder to releasably hold said support shafts axially in place, said lock means being releasable to permit said support shafts to be slid axially, said mill having one wall means adjacent one end of said cylinder and an opening defined in said one wall means and being positioned to align with each of said support shafts sequentially to permit removal of said support shafts through said opening in said one wall means without removing the cylinder from said mill.